United States Patent [19]

Goldman et al.

[11] Patent Number: 4,678,568

[45] Date of Patent: Jul. 7, 1987

[54] MULTI-USE AQUARIUM MAINTENANCE SYSTEM

[75] Inventors: Jerome Goldman, New York; Marvin Goldman, Great Neck; Gerald Phillips, Glen Cove; Terry Goldman, New York, all of N.Y.

[73] Assignee: Penn Plax Plastics, Inc., Garden City, N.Y.

[21] Appl. No.: 743,348

[22] Filed: Jun. 11, 1985

[51] Int. Cl.⁴ ............................................. E04H 3/16
[52] U.S. Cl. .................................................... 210/169
[58] Field of Search ............. 210/169, 425, 460, 416.2

[56] References Cited

U.S. PATENT DOCUMENTS

| | | | |
|---|---|---|---|
| 350,910 | 10/1886 | Bryant | 210/425 |
| 851,388 | 4/1907 | Wallace | 210/425 |
| 1,530,845 | 3/1925 | Milkey | 210/460 |
| 4,240,174 | 12/1980 | Thiem | 210/169 |
| 4,285,813 | 8/1981 | Stewart et al. | 210/416.2 |
| 4,512,724 | 4/1985 | Horvath | 210/169 |
| 4,559,136 | 12/1985 | Dockery | 210/169 |

*Primary Examiner*—Bernard Nozick
*Attorney, Agent, or Firm*—R. Scott Goldman

[57] ABSTRACT

A maintenance system for aquariums which utilizes an electrically powered suction force and a lift tube made of flexible plastic tubing. The lift tube may be provided with one or more branch points to allow for simultaneous or independent powering of a variety of aquarium maintenance accessories. The branch points may be further provided with valves in order to allow for a wide range of control over the suction force provided to the individual branches of the lift tubing.

17 Claims, 10 Drawing Figures

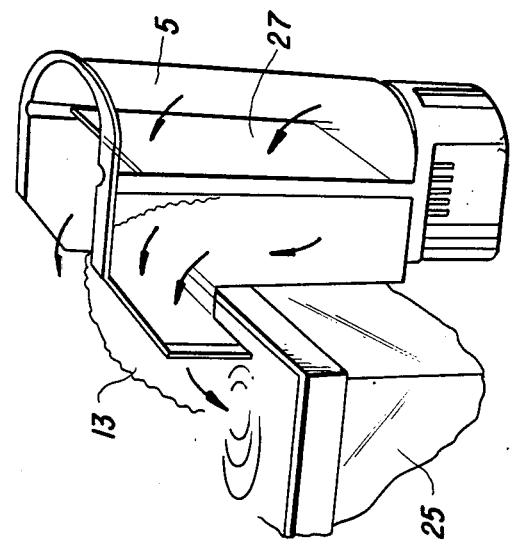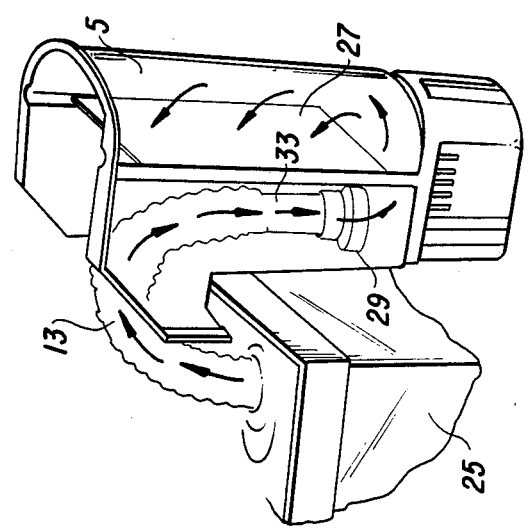

MULTI-USE AQUARIUM MAINTENANCE SYSTEM

BACKGROUND OF THE INVENTION

The present invention relates to a multi-use system for maintaining an aquarium in a suitable condition for keeping fish. More particularly, the present invention provides a system which enables the aquarium hobbyist to custom design aquarium cleaning and filtration through the use of a single outside of the tank water suction source. It allows for the removal of chemical and particulate wastes and debris from the aquarium by a number of cleaning and filtration methods, used either individually or in combination, and powdered by a single water suction source.

Conventional methods of cleaning and maintaining the water in an aquarium take a number of forms. A basic system used most often in small fish tanks of up to 20 gallons is a box or corner filter which is placed inside of the aquarium. A suction means is provided by the generation of bubbles, so that aquarium water is drawn into and through a cavity in the filter into which is placed filtering material. As an alternative means of providing the necessary movement of water through the cavity in the filter an outside of the take suction means may be attached to the filter. This means draws water through the filter cavity and out of the aquarium into the outside of the tank suction means and then returns the water back into the aquarium.

A more advanced form of aquarium filtration involves the use of an undergravel filter. This filter consists of a base plate which is placed under the gravel on the bottom of the aquarium. The plate is formed so that it is raised above the bottom surface of the aquarium so that a cavity is provided, the plate, which is bounded by the plate on top and the bottom of the aquarium on the botton. The plate is also provided with a plurality of small openings, usually in the form of holes or slits to allow the passage of water and debris therethrough. The plate is also fitted with one or more uptake tubes which extend out from openings in the plate and form a clear passage into the cavity under the plate. The uptake tube is provided with a suction means which draws water from the cavity under the plate up the uptake tube. This in turn draws water and debris from above the plate, through the small openings in the plate into the cavity, thus establishing a cyclical current. Often, the suction means is merely a bubbling device which is placed at the bottom of the uptake tube, and the uptake tube is provided with an opening for the bubbles to exit into the portion of the aquarium above the bottom plate. As the bubbles rise in the uptake tube and exit through the opening in the aquarium, water is drawn along with the bubbles. This creates the necessary current for the operation of the filter system. A more advanced suction system conventionally used to create and increase the necessary water flow in an undergravel filter involves the use of a power head. A power head is an outside of the tank suction means which is attached to the uptake tube of the undergravel filter. The outside the tank suction means draws water from the cavity up through the uptake tube and out of the tank. The water is then returned into the tank.

A third method of aquarium filtration involves the use of an outside of the tank power filter. These filters conventionally use a suction means which draws aquarium water and debris through a rigid lift tube and into a case which is provided with a filtering material. The case is formed so that the water and debris must pass through the filtering material prior to reentering the aquarium. The filtering material may be loosely packed into the case, or may be in the form of filter material cartridges. The uptake tube may just have an opened end, but it is preferable if it is provided with a strainer at the end which opens into the aquarium in order to prevent fish from being drawn into the filter system.

A further aquarium cleaning device is a vacuum/gravel cleaner. This device is provided with a suction means to draw water and debris out of the aquarium and through filtering material. The filtering material is often in the form of a cloth bag which will allow the water to pass through the bag but retain large debris particles within the bag. The vacuum/gravel cleaner is usually adapted to remove large particulate debris from the aquarium. This debris settles in the gravel bottom material of the aquarium and the vacuum/gravel cleaner is conventionally adapted to remove the debris while not lifting the gravel out of the aquarium. Therefore, it is preferable if the cleaner is provided with a means to control the suction power. Conventionally used suction means include a squeezable bulb at the top of the cleaner, or a battery operated motor and impeller. Also, the suction may be provided by a means similar to that used to power an outside the tank power filter.

Other filtering and cleaning systems used to maintain the water in an aquarium include a diatomaceous earth filter which utilizes diatomaceous earth to filter the water. This may be provided in the form of a cartridge insert in the filtering system. Another common filter system employs a biological foam which allows for the growth of micro-organisms therein. The water in the aquarium is broght into contact with the foam and the micro-organisms dispose of the waste material.

SUMMARY OF THE INVENTION

The object of the present invention is to provide a system which allows for both the simultaneous and independent function of a number of aquarium filtration and cleaning devices from the same suction power source.

A further object of the present invention is to provide a multi-use aquarium maintenance system which allows for the control of the amount of suction provide to each of the individual cleaning and filtration elements.

Another object of the present invention is to provide a multi-use aquarium maintenance system which allows for the circulation and cleaning of water from all areas of the aquarium, regardless of the placement of the suction power source.

Still another object of the present invention is to provide a multi-use aquarium maintenance system which allows for the water to be treated by a number of purification methods, regardless of the filtration element used to provide the water to be treated.

The present invention is based upon an outside of the tank suction power source which utilizes flexible, rather than rigid tubing for drawing the water out of the aquarium. The flexible tubing allows for the aquarium water to be drawn from any area of the aquarium no matter where the suction power source is placed. The flexible tubing may be made of varying lengths generally ranging from about six inches to 24 inches. It is preferable if sections of the tubing may be attached to each other. The tubing itself may be adapted to facilitate such attachment or connector sections may be provided in order to attach the various portions of tubing. The opening diameter of the flexible tubing is variable. It is preferable if the diameter ranges from 0.5 to 2.5 inches. The flexible tubing may be made of any material which will provide suitable flexibility, and which will withstand under water exposure. Plastic is the preferable material for forming the tubing. It may be clear or colored, and may be formed with a smooth outer surface, or the tubing may be ribbed to provide ease of flexibility. In order to facilitate varying the length of the tubing to fit a particular situation, the material should be formed so that it can be cut without much difficulty. The flexible tubing may also be fitted with a means to attach it to the wall of the aquarium in order to maintain the placement of the tube. A suitable means of attachment is one or more suction cups which are removeably connected to the tubing and then suctioned to appropriate portions of the aquarium inner wall.

The lift tube of the present invention may be provided with one or more branch points in order to allow multiple, simultaneous filtration and cleaning uses. The branch points may be in the form of T, Y or other suitable hollow tubing sections. The individual branches should be adapted so that the ends may be connected to a variety of elements such as the uptake tube of an undergravel filter, strainer ends for power filter use, vacuum/gravel cleaning ends, box type filter cartridges placed in the aquarium water or any other cleaning, or filtering elements or other accessories requiring suction power. Uniform branch ends may be provide with a variety of adapting accessory element connectors with one end formed to fit the branch end and the other end formed to fit the desired cleaning element. These may be removably attached to the ends of the tubing branches. The flexibility of the tubing, along with the branch points and the connection adapted ends of the branches allow for a vast number of combinations of the aquarium filtration and cleaning techniques using a single suction power source.

Additionally, the branch points of the flexible tubing may be provided with a valve which allows for the adjustment of the flow of water between the various branches of the flexible tubing. The valves may take any conventional form which will allow for the adjustment of the water flow from any of the branches. A preferable form may be a portion of a cylindrical tube which is fitted within an outer cylindrical tube, the outer tube being provided with openings connecting to the various tubing branches. The flow to each branch is then adjusted by covering the the openings of the branches to different extents using the inner partial cylindrical tube. The system may be provide with one or more valves depending upon the number of branches to be controlled. This allows for complete control over the amount of water coming from the various cleaning and filtering elements attached to the individual branches.

The water suction power unit which is the driving force of the present invention may utilize any known type of electically operated outside the tank powering apparatus. The intake of of the suction power unit must be adapted so as to fit the flexible lift tubing. The driving system should provide sufficient power in order to drive a multiplicity of cleaning and filtering elements either simultaneously or individually. A sufficient suction power is preferably a pumping capacity of over about 100 gallons per hour. The water suction power system is preferably formed from a pump powered by a motor using an electro-magnetic field created by electrifying coil and lamination stacking. This is coupled with a cylindrical 2-pole magnet impeller in a partially enclosed chamber. The impeller turns due to the electro-magnetic field and this in turn causes a centrifugal pump means of suction. For ease of operation it is preferable if the motor is of the self starting type and does not require lubrication. A suitable suction powering system is disclosed in U.S. Ser. No. 385,766. This may be employed for coupling the partially enclosed chamber to the coil and lamination stacking. This system is designed so that the motor in its case can be rotated in an arc around the impeller chamber to assist in starting an electro-magnetically locked impeller while the motor is in place attached to the case.

Further, the present invention provides a filter case which is attached to the water suction power system and into which the suctioned water flows before reentering the aquarium. The filter case is also adapted to be atrtached to the outside of the aquarium by a means such as a hanger fitting over the side wall of the aquarium. The flexible intake tube is attached to the suction power source inside the filter case and allows the suctioned water to flow in the filter case. The filter case may be formed from any material which will withstand water exposure and securely hold water inside. Metal, and glass are acceptable, and plastic is a preferable material for forming the filter case since it can withstand strenuous use.

Additionally, the filter case may be formed to hold filtering material either loosely packed or in the form of cartridges. The cartridge form is preferable since it facilitates the use of filtering material such as filter floss, carbon, zeolite for ammonia removal and biological foam either seperately or in combionation. In order to accommodate a cartridge filter material channels may be formed in the case into which the cartridge is fitted. Further, in order to provide effective filtration the filter case and intake tubing should be arranged so the the water must flow through the filter material in order to reenter the aquarium. This may be accomplished by having the water enter the case through the back of the filter case and placing the filter material as a barrier between the entering water and the path of entry back into the aquarium. While it is essential to have the water flow through the filtering material, in order to provide filtration, when the present invention is used to power a power filter, this arrangment for the flow of water is particularly suited when the invention is used with a power head element attached to an undergravel filter. Known power heads for undergravel filters do not allow for the additional filtration of the aquarium water using such an extensive variety of water purification methods.

BRIEF DESCRIPTION OF THE DRAWINGS

The above and other objects of and advantages of the present invention will become readily apparent by reference to the following description when considered in conjunction with the drawings wherein:

FIGS. 4A and B show the prefered flexible tubing of the present invention and depict the prefered path for the flow of water into the case from the aquarium, through the filter material cartridge and back into the aquarium. Like references refer to like parts throughout the several views of the drawings.

DETAILED DESCRIPTION OF THE PREFERRED EMBODIMENT

Figure 1:
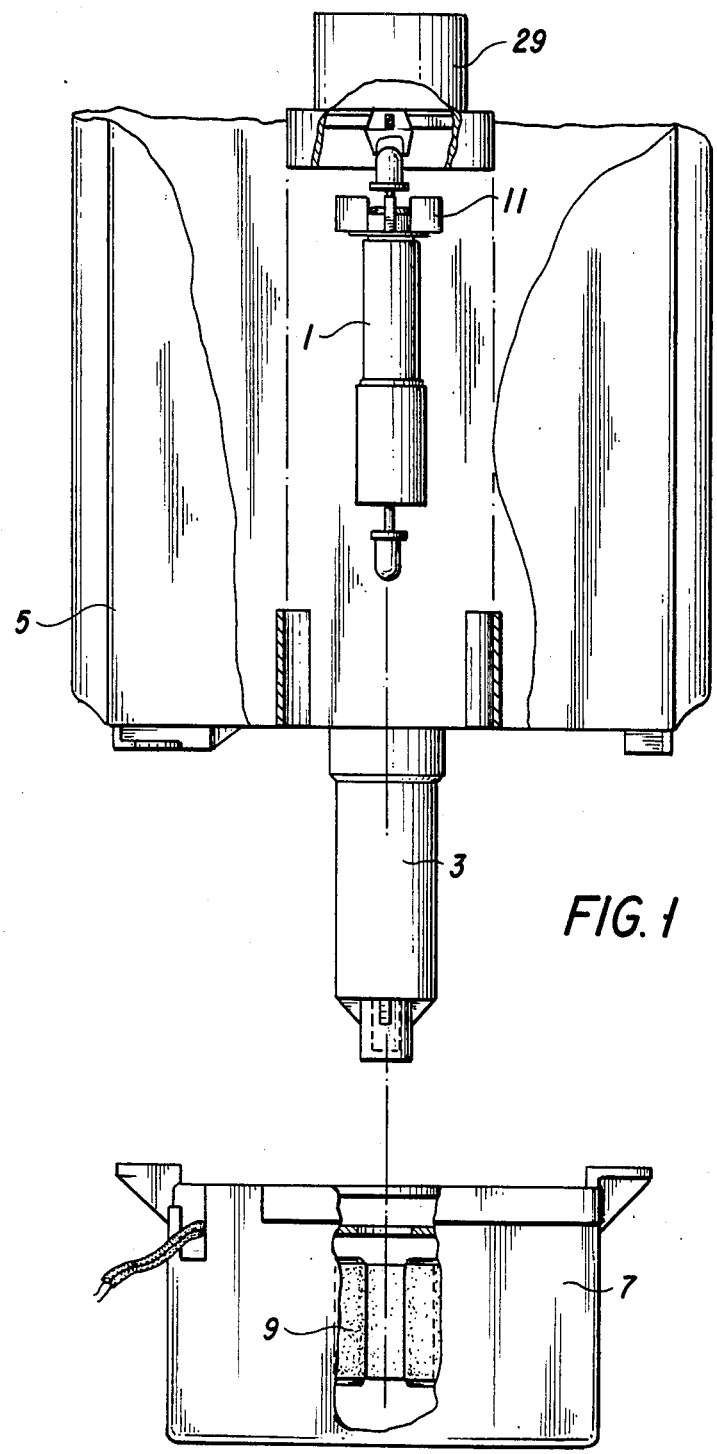
FIG. 1 is an exploded view of the the prefered water suction power source of the present invention, including a portion of the filter case, showing the placement of the impeller and the impeller housing and the electro-magnetic field generating means.

FIG. 1 shows the preferred water suction power source of the present invention. The cylindrical 2-pole magnet impeller 1 fits into a partially enclosed chamber 3 at the bottom of the filter case 5. The partially enclosed chamber 3 fits into the removable motor housing 7, so that the partially enclosed chamber is surrounded by the source of an electro-magnetic field 9. The blades of the impeller 11 spin to provide a centrifugal pump means of suction. The tube/case coupler 29 is fitted above the impeller chamber 3. The filter case 5 is fully removable from the power source for ease of cleaning.

Figure 2A:
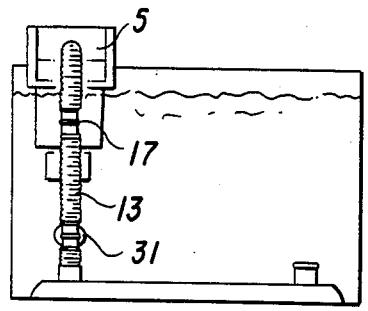
FIGS. 2A to D illustrate various configurations of filtering elements which may be achieved by the present invention through the use of flexible tubing and branch points. These figures also illustrate the prefered ribbed flexible tubing of the present invention.

FIG. 2A shows the present invention when it is used to form a single power head for an undergravel filter. The prefered ribbed flexible tubing 13 is connected to the undergravel filter 15 and draws water from under the undergravel filter into the case 5. Rather than direct attachment as depicted, a rigid lift tube and connector may also be used to attach the flexible tubing to the undergravel filter. Individual sections of flexible tubing are connected by a tubing connector 17 and the tubing is held in place by a suction cup 31 attached to the wall of the aquarium.

Figure 2B:
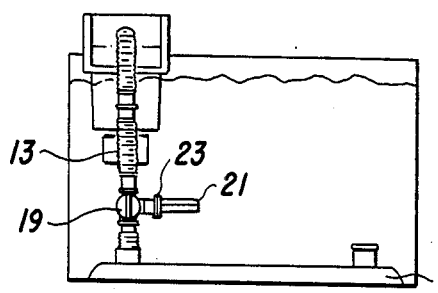

FIG. 2B shows the present invention in a multiple use situation. The flexible tubing 13 is connected to a branch point having a valve 19 incorporated therein. One branch of the flexible tubing is connected to an undergravel filter while the second branch is connected to a power filter strainer 21 utilizing an accessary element connector 23. The valve 19 provides the ability to adjust the flow of water from either the undergravel filter or the power filter strainer by changing the suction force provided to the branches of the flexible tubing.

Figure 2C:
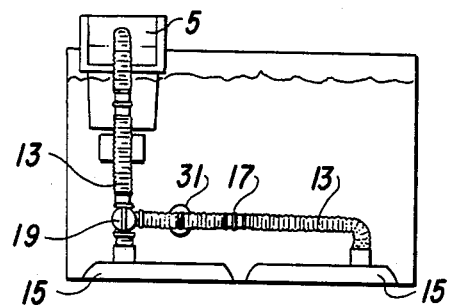

FIG. 2C illustrates another multi-use application of the present invention. The flexible tubing 13 is connected to a branch point having a valve 19 incorporated therein. One branch of the flexible tubing 13 is connected as a power head to an undergravel filter 15 which sits directly under the case. The second branch is connected to a second under gravel filter 15 at a point on the other side of the aquarium. This demonstrates how the flexible tubing allows the present invention to provide filtration at points which are far away from the suction power source and filter case 5. Further, a tubing connector 17 connects two segments of flexible tubing 13. The valve 19 adjusts the flow of water from the two undergravel filter inlets. The suction cup 31 means of holding the tubing in place is also illustrated.

Figure 2D:
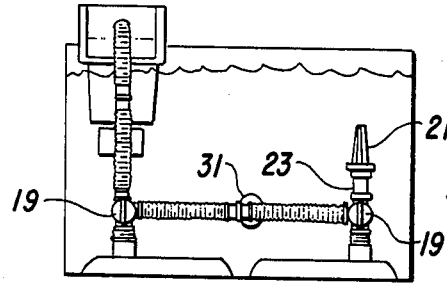

FIG. 2D illustrates the present invention in a triple mode of use. This figure is essentially the same as the above described FIG. 2C, but incorporates an additional branch point and valve. The additional branch point provides an additional branch which is connected to a power filter strainer 21 by means of an accessory element connector 23. The invention thereby allows use of a double power head in conjunction with a power filter element. The second valve 19 adjusts the flow from the second undergravel filter element and the power filter strainer. A suction cup 31, may be provided to keep the flexible tubing 13 in place against the wall of the aquarium.

As illustrated in FIGS. 2A to 2D, the present invention also provides for the additioaal filtration of the water drawn from the cavity under the undergravel filter. This water flows directly into the filter case 5, and may be subjected to various purification methods by directing the water flow in the filter case through various filtration materials, see FIG. 4A and B.

Figure 3A:
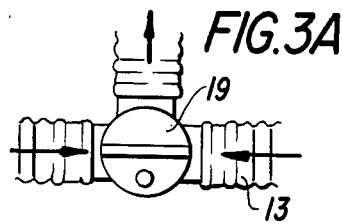
FIGS. 3A to C are representations of branch points incorporating the valve of the present invention illustrating how the amount of flow from the various branches can be controlled.
Figure 3B:
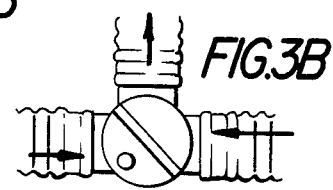
Figure 3C:
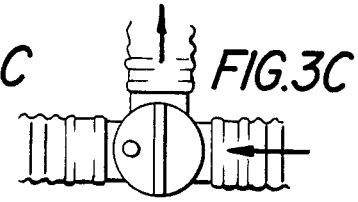

FIGS. 3A to C show that the valve 19 adjusts the flow of water from the various flexible tubing 13 branches. In FIG. 3A the flow from the right and left hand branches is equal. In FIG. 3B the larger and higher arrow in the right branch signifies a stronger flow in this branch as compared to the smaller lower arrow in the left side. FIG. 3C shows that one branch, in this case the left branch may be completely shut down with all the water flow coming from the other branch, the right branch. These figures show that the valve 19 may be used to adjust the water flow in any proportional combination from 100% right and 0% left, to 0% right and 100% left.

FIG. 4A illustrates the preferred flow of water from the aquarium 25 through the flexible lift tube 13 into the back of the filter case 5 and through a filter material cartridge 27. The arrows signify the flow of water. FIG. 4B shows that once the water passes through the filter material it is returned to the aquarium. These figures also illustrate how the filter case 5 may be formed to hang over the side of the aquarium and how the filter case may be adapted in order to accept a flexible intake tube 13, by means of a tube/case coupler 29. A portion of rigid tubing, 33 may be used to aid in the attachment to the tube/case coupler 29.

It is readily apparent that the above described multi-use aquarium maintenance system meets all of the objectives mentioned as well as providing other advantages for a filtering cleaning and purifying aquarium water. It should be understood that the specific form of the invention here and above described is intended to be representational only, as certain modifications within the scope of these teachings will be apparent to those skilled in the art of aquarium maintenance systems.

Accordingly, reference should be made to the following claims to determine the full scope of the invention.

What is claimed:

1. In an aquarium maintenance apparatus having the conventional components including
   (a) an electrically powered means for suctioning water;
   (b) a filter case removably attached to the water suction means in a manner so that the suctioned water enters the filter case.
   (c) a lift tube formed of a segment of plastic tubing, removably attached to the water power suction means at a point inside the filter case in a manner which draws suctioned water through the lift tube, the lift tube having an open end within the filter case to allow the entry of the suctioned water from an aquarium into the filter case and an opposite opened end which may be placed inside the aquarium;

(d) a means for allowing the suctioned water to return to the aquarium, from the filter case, formed on the filter case the improvement comprising: enabling the maintenance apparatus to function as a multi-use aquarium maintanence system by providing a branched section of hollow tubing having a plurality of branches, removably attached to the plastic lift tube to provide two or more branched lift tube segments each having an opened end.

2. The improved aquarium maintenance apparatus of claim 1 wherein the lift tube is flexible.

3. The improved aquarium maintenance apparatus of claim 2 wherein the plurality of branches of the branched section of hollow tubing are formed from a flexible plastic.

4. The improved aquarium maintenance appartus of claim 1 which further comprises at least one suction cup removably attached to the plastic lift tube.

5. The improved aquarium maintenance apparatus of claim 1 wherein the opened ends of the branched lift tube segments are adapted to connect to an aquarium maintenance accessory.

6. The improved aquarium maintenance apparatus of claim 1 which further comprises an aquarium accessory element connector which is removably attached to the opened ends of the branched lift tube segments.

7. The improved aquarium maintenance apparatus of claim 1 wherein the filter case is adapted to accomodate cartridge filter material and the lift tube is attached to the water suction means in a manner so that water entering the filter case must pass through the filter material cartridge before returning to the aquarium.

8. The improved aquarium maintenance apparatus of claim 1 which further comprises a valve, adapted to control the amount of water flow through the various branches of a branched hollow tube, the valve positioned within the branched section of hollow tubing.

9. The improved aquarium maintenance apparatus of claim 8 wherein the opened ends of the branched lift tube segments are adapted to connect to an aquarium maintenance accessory.

10. The improved aquarium maintenance apparatus of claim 8 which further comprises an aquarium accessory element connector which is removably attached to the opened ends of the branched lift tube segments.

11. The improved aquarium maintenance apparatus of claim 8 wherein the filter case is adapted to accomodate cartridge filter material and the lift tube is attached to the water suction means in a manner so that water entering the filter case must pass through the filter material cartridge before returning to the aquarium.

12. The improved aquarium maintenance apparatus of claim 8 which further comprises at least one suction cup removably attached to the plastic lift tube.

13. The improved aquarium maintenance apparatus of claim 12 wherein the filter case is adapted to accomodate cartridge filter material and the lift tube is attached to the water suction means in a manner so that water entering the filter case must pass through the filter material cartridge before returning to the aquarium.

14. The improved aquarium maintenance apparatus of claim 12 wherein the opened ends of the branched lift tube segments are adapted to connect to an aquarium maintenance accessory.

15. The improved aquarium maintenance apparatus of claim 11 wherein the filter case is adapted to accomodate cartridge filter material and the lift tube is attached to the water suction means in a manner so that water entering the filter case must pass through the filter material cartridge before returning to the aquarium.

16. The improved aquarium maintenance apparatus of claim 12 which further comprises an aquarium accessory element connector which is removably attached to the opened ends of the branched lift tube segments.

17. The improved aquarium maintenance apparatus of claim 16 wherein the filter case is adapted to accomodate cartridge filter material and the lift tube is attched to the water suction means in a manner so that water entering the filter case must pass through the filter material cartridge before returning to the aquarium.

* * * * *